United States Patent [19]
Kitai et al.

[11] 4,208,111
[45] Jun. 17, 1980

[54] SYNCHRONIZING DEVICE FOR ELECTRONIC PROGRAM SHUTTER

[75] Inventors: Kiyoshi Kitai; Yukio Morino; Shogo Kato; Masanori Watanabe, all of Yotsukaido, Japan

[73] Assignee: Seiko Koki Kabushiki Kaisha, Japan

[21] Appl. No.: 18,914

[22] Filed: Mar. 9, 1979

[30] Foreign Application Priority Data

Mar. 10, 1978 [JP] Japan ................................ 53/28131

[51] Int. Cl.$^2$ .......................... G03B 7/16; G03B 9/08
[52] U.S. Cl. ....................................... 354/33; 354/34; 354/230
[58] Field of Search ....................... 354/23, 34, 26, 27, 354/29, 30, 31–33, 230, 234, 235

[56] References Cited
U.S. PATENT DOCUMENTS

| 3,535,991 | 10/1970 | Kitai | 354/33 |
| 3,613,533 | 10/1971 | Kitai | 354/33 |
| 3,838,433 | 9/1974 | Imura | 354/31 X |
| 4,107,705 | 8/1978 | Hashimoto et al. | 354/230 X |

Primary Examiner—Donald A. Griffin
Attorney, Agent, or Firm—Robert E. Burns; Emmanuel J. Lobato; Bruce L. Adams

[57] ABSTRACT

In an electronic program shutter having sectoral shutter blades functioning in varying both the aperture and the exposure time corresponding to the brightness of the field, a synchronizing device according to the present invention comprises a sectoral shutter blade control lever which is oscillatable and capable of opening and closing the sectoral shutter blades and is normally urged in the direction that the sectoral shutter blades keep the aperture closed, a driving member which travels in one direction according to the shutter release operation, an actuating lever rotatable about a shaft fitted on the driving member and interlocked with the sectoral shutter blade control lever, an electromagnet which is unmagnetized at an exposure completion signal given by an exposure control circuit, and an armature which operates a flash light switch and cancels the engagement between the sectoral shutter blade control lever and the actuating lever when the electromagnet is unmagnetized and the attraction by the electromagnet is cancelled.

3 Claims, 5 Drawing Figures

SYNCHRONIZING DEVICE FOR ELECTRONIC PROGRAM SHUTTER

BACKGROUND OF THE INVENTION

This invention relates to a synchronizing device of an electronic program shutter and more particularly to a synchronizing device for an electronic program shutter capable of synchroflash photographing corresponding to the brightness of the field through all exposure conditions.

DESCRIPTION OF THE PRIOR ART

In flash light photographing by a camera equipped with an electronic program shutter of the conventional type, which is called "Flashmatic", when the shutter is adjusted to the flash light photographing setting, the exposure time is fixed and the aperture is varied according to the subject distance, the sensitiy of the film used and the guide number, and in this case it is usual that the exposure time is fixed at around one-thirtieth seconds, consequently, problems such as camera shake and image movement of a fast moving object are liable to occur and furthermore, the conventional system has the disadvantage that over-exposure occurs in photographing an object by the window in back-light condition as the effect of the natural light is not taken into account.

In order to overcome the disadvantage mentioned above, a method of controlling the exposure of an AE system even in the flash light photographing, which is called "day-light synchro-flash photography", is introduced to obtain correct exposure taking the effect of the natural light into account. However, when the AE system functions in the flash light photographing as explained above, the movement of the sectoral shutter blades varies corresponding to the brightness of the field so that the time from the actuation of the electromagnetic device by the exposure control circuit to the initiation of closing motion of the sectoral shutter blades (called "Mg delay time" hereinafter) becomes longer for the longer subject distance, therefore, it is difficult to synchronize the flashing timing with the maximum opening of the aperture determined according to the exposure condition corresponding to the brightness of the field.

SUMMARY OF THE INVENTION

Accordingly, an object of the invention is to provide a synchronizing device of simple construction with less component parts for the electronic program shutter capable of controlling the day-light synchroflash photographing corresponding to the brightness of the field throughout the exposure conditions by fixing the Mg delay time at a constant independently of the brightness of the field.

In an electronic program shutter having sectoral shutter blades functioning in varying both the aperture and the exposure time corresponding to the brightness of the field, a synchronizing device according to the present invention comprises a sectoral shutter blade control lever which is oscillatable and capable of opening and closing the sectoral shutter blades and is normally urged in the direction that the sectoral shutter blades keep the aperture closed, a driving member which travels in one direction according to the shutter release operation, a sectoral shutter blade control lever actuating lever rotatable about a shaft fitted on the driving member and interlocked with the sectoral shutter blade control lever, an electromagnetic device which is unmagnetized at an exposure completion signal given by an exposure control circuit, an armature actuated by the electromagnetic device to operate the actuating lever, and a switch which is operated synchronously with the exposure operation to correctly actuate the flashing device. Both or one of the faces of the armature that engage with the sectoral shutter blade control lever actuating lever is shaped so as to close the switch around the maximum opening of the aperture determined corresponding to the brightness of the field.

DETAILED DESCRIPTION OF THE PREFERRED EMBODIMENTS

Figure 1:
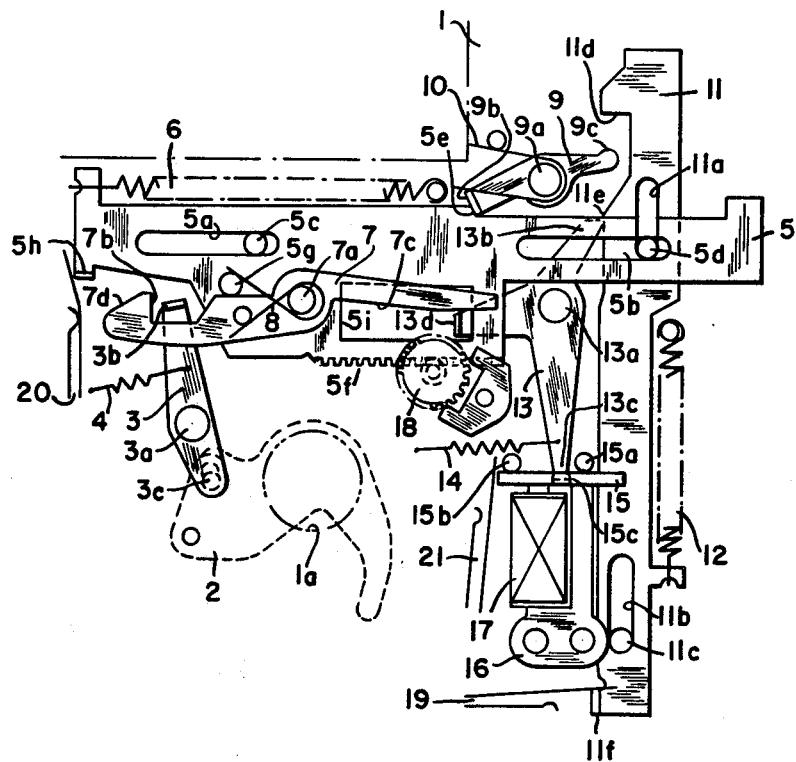
FIG. 1 is a schematic plan view of a shutter according to the present invention in charged state.

Referring to FIG. 1 illustrating a shutter according to the present invention in charged state, reference numeral (1) indicates a shutter base plate, reference numeral (1a) indicates an aperture, reference numeral (2) indicates a sectoral shutter blade used both as a shutter blade and a diaphragm and for clarity, in the drawing, only one of two pieces of the sectoral shutter blades is shown. A sectoral shutter blade control lever (3) is rotatable about a shaft (3a) fixed on the shutter base plate (1) and provided with a raised part (3b) and a pin (3c) fitted in a slot on the sectoral shutter blade (2). The sectoral shutter blade control lever (3) is urged counterclockwise by a spring (4) so that the sectoral shutter blade (2) is kept at the closed position. A driving member (5) having slots (5a) and (5b), a shoulder (5e), a rack (5f), a pin (5g), a raised part (5h) and an opening (5i), is guided by pins (5c) and (5d) both fixed to the shutter base plate and fitted in the slots (5a) and (5b), respectively, and is urged rightward by a spring (6). A sectoral shutter blade control lever actuating lever (7) having a hooked part (7b) to be engaged with the raised part (3b) of the sectoral shutter blade control lever (3), an edge (7c) and an oblique edge (7d) is rotatable about a shaft (7a) fixed on the driving member (5) and is urged clockwise by a spring (8) being stopped by a pin (5g) fixed on the driving member (5).

A detent (9) having a raised part (9b) engaging with the shoulder (5e) of the driving member (5) and an arm (9c) is rotatable about a shaft (9a) fixed on the shutter base plate (1) and is urged counterclockwise by a spring (10). A release member (11) having a protrusion (11d) to be engaged with the arm (9c) of the detent (9), a straight edge (11e) and a raised part (11f) is guided by pins (5d) and (11c) fixed on the shutter base plate (1) and fitted in slots (11a) and (11b), respectively, and is urged upwards by a spring (12). An armature lever (13) having an arm (13b) engaging with the straight edge (11e) of the release member (11), an arm (13c) and a raised part (13d) facing the edge (7c) of the actuating lever (7), is urged clockwise by a spring (14). An armature (15) having a guide hole (15c) for receiving the arm (13c) of the armature lever (13) is guided by pins (15a) and (15b) both fixed on the shutter base plate (1). An exciting coil (17) of an electromagnetic device is connected to a known exposure control circuit. A governor (18) is composed of an escape wheel and an anchor. Reference numeral (19) indicates a contact for the power source, (20) a contact for actuating the exposure control circuit and (21) a contact for a synchroflash, respectively.

Figure 2:
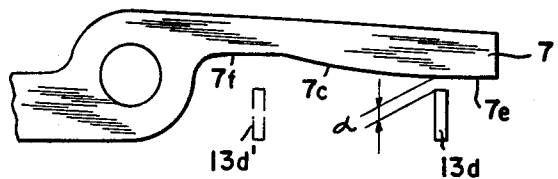
FIG. 2 is a schematic plan view of a part of FIG. 1.

Referring to FIG. 2, illustrating an enlarged plan view of a part of the actuating lever (7) and its associated parts of FIG. 1, the edge (7c) is formed of a combination of curved edges (7e) and (7f) and is positioned relative to the raised part (13d) of the armature lever (13) with a space between them.

Figure 3:
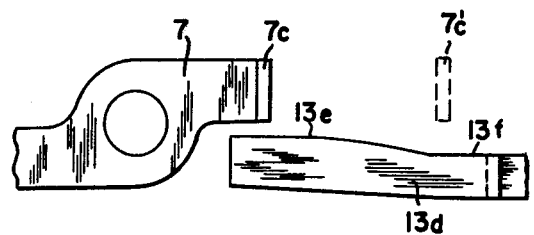
FIG. 3 is a schematic plan view of a part shown in FIG. 2 in a modified form.

Referring to FIG. 3, illustrating a modified form of FIG. 2, a raised part (7c) is provided for the actuating lever (7) and the raised part (13d) of the armature lever (13) is formed of a combination of a curved edges (13e) and (13f).

Figure 4:
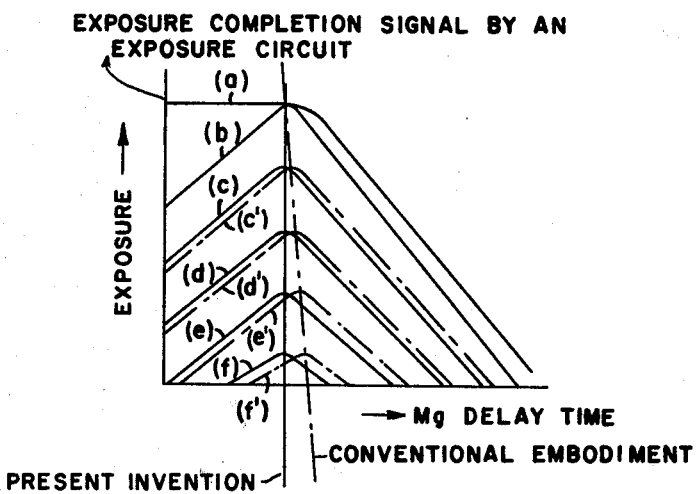
FIG. 4 illustrates the relation between exposure and the Mg delay time.

Referring to FIG. 4, illustrating the relation between exposure and the Mg delay time for the conventional method and the method according to the present invention, the continuous lines and the alternate long and short dash lines indicate the relation for the method according to the present invention and the conventional method, respectively. The curve indicated by (a) illustrates the relation when the object is dark and the curves (f) and (f') indicate the relation when the object is brighter.

Figure 5:
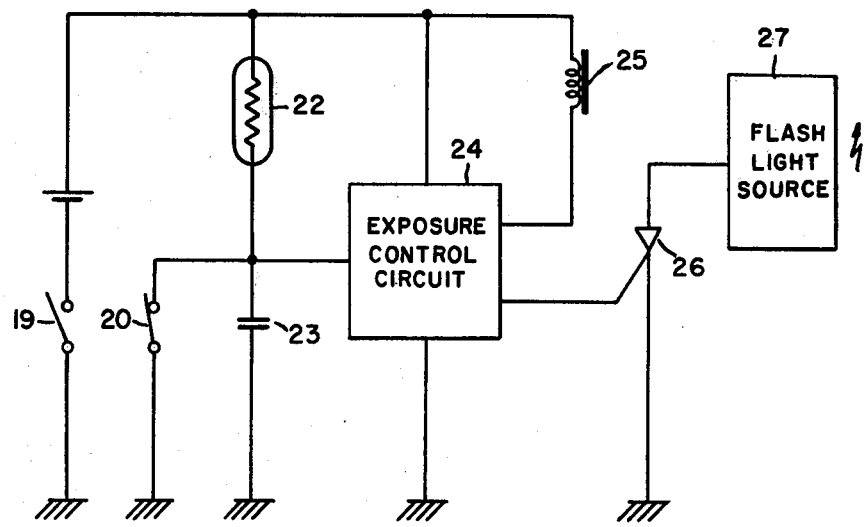
FIG. 5 illustrates a modified form of the switching system according to the present invention.

FIG. 5 is a modified form of the switching system according to the present invention. The switching system comprises a photoconductive cell (22) to receive the light reflected on the photographing object, a condenser (23) for the CR circuit, an exposure control circuit (24), an electromagnetic device (25) to control the completion of exposure under the control of the exposure control circuit (24) and a semiconductive element (26) (called "SCR" hereinafter) such as a silicon rectifier. Reference numeral (27) indicates a flash light source. In FIG. 5, the parts functioning similarly to those of FIG. 1 are indicated by like reference numerals, therefore, explanation thereof will be omitted to avoid duplication.

The manner of operation of the various parts described in connection with the drawings will be explained particularly with reference to the schematic illustration in FIG. 1. When the release member (11) is depressed starting from the state as shown in FIG. 1, the power source contact (19) is closed in the initial stage of movement of the release member (11) to actuate the exposur is control circuit so as to feed electric current to the exciting coil (17) so that the armature (15) is attracted by the electromagnet. As the release member (11) is depressed further, the protrusion (11d) of the release member (11) pushes the detent (9) at the arm (9c) to turn the detent (9) clockwise against the spring (10) so that the detention of the driving member (5) at the shoulder (5e) by the raised part (9b) of the detent (9) is cancelled and the driving member (5) is allowed to start travelling rightwards pulled by the spring (6). The travelling speed of the driving member (5) is controlled by the governor (18). The raised part (5h) of the driving member (5) opens the contact (20) so that the exposure control circuit is actuated. According to the travelling of the driving member (5), the hooked part (7b) of the actuating lever (7) fitted on the driving member (5) pulls the sectoral shutter blade control lever (3) at the raised part (3b) to turn the sectoral shutter blade control lever (3) clockwise against the spring (4) so that the sectoral shutter blade (2) is opened. After a time determined dependently on the brightness of the field, the exposure control circuit inverses and the electric current flowing through the excitation coil (17) is cut off so that the attraction of the armature (15) by the electromagnet is cancelled allowing the armature lever (13) to turn clockwise pulled by the spring (14). According to the clockwise rotation of the armature lever (13), the raised part (13d) pushes the actuating lever (7) at the edge (7c) to turn counterclockwise against the spring (8) and finally, the engagement of the hooked part (7b) of the actuating lever (7) with the raised part (3b) of the sectoral shutter blade control lever (3) is cancelled so that the sectoral shutter blade control lever (3) is allowed to turn counterclockwise pulled by the spring (4) closing the sectoral shutter blade (2).

When the depression on the release member (11) is cancelled at the completion of exposure, the spring (12) pulls the release member (11) upwards, while the straight edge (11e) of the release member (11) pushes the armature lever (13) at the arm (13b) to turn counterclockwise against the spring (14), consequently, the armature (15) is restored to the initial position. As the release member (11) moves upwards further, the power source contact (19) is allowed to open, then the electric current flowing through the exposure control circuit is cut off. In re-charging the shutter, as the driving member (5) is pushed leftwards against the spring (6), the oblique edge (7d) of the actuating lever (7) comes to hit against the raised part (3b) of the sectoral shutter blade control lever (3) and passes under the raised part (3b) as the actuating lever (7) is forced to turn counterclockwise against the spring (8) while the sectoral shutter control lever (3) is kept resting. Finally, the driving member (5) is restored to the position as shown in FIG. 1 and is retained by the detent (9).

The manner of operation of the shutter according to the present invention in the day-light synchroflash photographing will be explained hereinafter. Before operating the shutter, the changeover switch, not shown, is changed-over to the flash-light photographing position, the lens is focused by means of the focusing ring, not shown, and accurate exposure is determined relative to the subject distance by applying the flashmatic system to the AE system. After the release member (11) is depressed, the shutter performs the operations as explained hereinbefore referring to FIG. 1 and finally the armature lever (13) is turned clockwise to close the sectoral shutter blade (2). In the final range of the clockwise rotation of the armature lever (13), the synchroflash contact (21) is closed to actuate the flashing device. The closing timing of the synchroflash contact is fixed at all times regardless of the brightness of the object. As shown in FIG. 2, by designing properly the shape of the curved edge formed of (7c), (7e) and (7f) of the actuating lever (7) so as to vary the timing of engagement of the raised part (13d) with the curved edge (7c) corresponding to the brightness of the object, the Mg delay time against the brightness of the object is kept constant as shown in FIG. 4, therefore, the timing of peak luminance of the flash light and that of the engagement of the raised part (13d) with the curved edge (7c) are easily synchronized.

Referring now to FIG. 5, explanation will be made on the manner of operation of a modified form of the switching system according to the present invention, but only on the points that differ from the operation of the switching system shown in FIG. 1. In the day-light synchroflash photographing, when the release member (11) is depressed, the sectoral shutter blade (2) is opened in the same procedure as explained hereinbefore referring to FIG. 1, then the CR circuit consisting of a photoconductive element (22) and a condenser (23) actuates the exposure control circuit to inverse and the electric current flowing through the electromagnet is cut off so that the sectoral shutter blade is closed, while the SCR is continued synchronously with the exposure completion operation of the exposure control circuit (24) so that the flashing device (27) is actuated to flash. Successful day-light synchroflash photographing is performed in the manner as explained referring to FIG. 1 by arranging the relation between the actuating lever (7) and the electromagnetic device (25) as shown in FIGS. 2 and 3.

Although the armature lever (13) and the armature (15) are separate element in the preferred embodiment, it is to be understood that the object of the invention is attained if the armature lever and the armature are formed in one body.

The synchronizing device according to the present invention being constituted as hereinbefore explained, the Mg delay time is fixed at all times even when the exposure varied corresponding to the brightness of the field, accordingly, day-light synchroflash photographing is possible over all range of exposure corresponding to the brightness of the field, while the present invention contributes to the reduction of the dimensions of the device and of the manufacturing costs because the synchronizing device according to the present invention is simply constituted with less component parts.

We claim:

1. A synchronizing device, for an electronic program shutter having sectoral shutter blades functioning in varying both the aperture and the exposure time corresponding to the brightness of the field, comprising a sectoral shutter blade control lever which is oscillatable and capable of opening and closing the sectoral shutter blades and is normally urged in the direction that the sectoral shutter blades keep the aperture closed, a driving member which travels in one direction according to the shutter release operation, an actuating lever rotatable about a shaft fitted on said driving member and interlocked with said sectoral shutter blade control lever for controlling the operation of said sectoral shutter blade control lever to actuate said sectoral shutter blades, an electromagnetic device which is unmagnetized at the exposure completion signal given by an exposure control circuit, an armature which operates said actuating lever when the attraction by said electromagnetic device is cancelled, and a switching device which is actuated synchronously with the exposure completion operation, characterized in that both or either one of the engaging parts of said armature and said actuating lever is formed so that said switching device is closed about the maximum aperture of the exposure corresponding to the brightness of the field.

2. A synchronizing device for an electronic program shutter as set forth in claim 1 wherein said switching device is constituted of a contact which is closed after the operation of said electromagnetic device.

3. A synchronizing device for an electronic program shutter as set forth in claim 1 wherein said switching device is an electronic switching means actuated at an operation completion signal given by said exposure control circuit.

* * * * *